US012686069B2

(12) United States Patent
Rozmarynowski et al.

(10) Patent No.: US 12,686,069 B2
(45) Date of Patent: Jul. 21, 2026

(54) METHOD AND APPARATUS FOR SETTING UP WELDING PARAMETERS

(71) Applicant: Illinois Tool Works Inc., Glenview, IL (US)

(72) Inventors: Scott Ryan Rozmarynowski, Greenville, WI (US); Chris J. Roehl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1006 days.

(21) Appl. No.: 15/177,435

(22) Filed: Jun. 9, 2016

(65) Prior Publication Data

US 2017/0355036 A1      Dec. 14, 2017

(51) Int. Cl.
| | |
|---|---|
| *B23K 9/095* | (2006.01) |
| *B23K 9/10* | (2006.01) |
| *B23K 9/12* | (2006.01) |
| *B23K 9/167* | (2006.01) |
| *B23K 9/173* | (2006.01) |
| *B23K 9/18* | (2006.01) |

(52) U.S. Cl.
CPC ............ B23K 9/0953 (2013.01); B23K 9/095 (2013.01); B23K 9/1087 (2013.01); B23K 9/125 (2013.01); B23K 9/167 (2013.01); B23K 9/173 (2013.01); B23K 9/18 (2013.01)

(58) Field of Classification Search
CPC ..... B23K 9/0953; B23K 9/095; B23K 9/1087
USPC ................... 219/130.01, 130.5, 130.51, 132; 700/145, 177, 298
See application file for complete search history.

(56) References Cited

U.S. PATENT DOCUMENTS

| | | | | |
|---|---|---|---|---|
| 2,005,125 | A | 6/1935 | Bannister | |
| 2,014,061 | A | 9/1935 | Anderson | |
| 6,096,994 | A | 8/2000 | Handa et al. | |
| 7,751,926 | B2 * | 7/2010 | DiVenere | B23K 9/1006 |
| | | | | 700/83 |
| 8,546,728 | B2 | 10/2013 | Sickels | |
| 8,604,389 | B2 | 12/2013 | Stanzel | |
| 9,174,295 | B2 | 11/2015 | Swartz | |
| 2005/0125084 | A1 | 6/2005 | Harvey | |
| 2009/0152251 | A1 * | 6/2009 | Dantinne | B23K 9/0953 |
| | | | | 219/125.1 |
| 2012/0241429 | A1 | 9/2012 | Knoener | |
| 2013/0341307 | A1 | 12/2013 | Sickels | |
| 2014/0061169 | A1 | 3/2014 | Sammons | |

(Continued)

FOREIGN PATENT DOCUMENTS

| | | |
|---|---|---|
| CN | 102834212 | 12/2012 |
| CN | 103221172 | 7/2013 |

(Continued)

OTHER PUBLICATIONS

Extended European Search Report Appln No. 17174248.9 dated Dec. 5, 2017 (23 pages).

(Continued)

*Primary Examiner* — Edward F Landrum
*Assistant Examiner* — Thomas J Ward
(74) *Attorney, Agent, or Firm* — McAndrews, Held & Malloy, Ltd.

(57) ABSTRACT

Provided is a disclosure for a welding system with a display device configured to display an electronic parameter chart for use in setting up the welding system for use.

22 Claims, 10 Drawing Sheets

(56) References Cited

U.S. PATENT DOCUMENTS

| | | | |
|---|---|---|---|
| 2014/0061176 A1 | 3/2014 | Stanzel | |
| 2015/0122781 A1* | 5/2015 | Albrecht ............ | G05B 19/0426 |
| | | | 219/136 |
| 2016/0271717 A1 | 9/2016 | Knoener | |
| 2016/0311045 A1 | 10/2016 | Sickels | |
| 2017/0165775 A1 | 6/2017 | Knoener | |
| 2017/0189987 A1 | 7/2017 | Sickels | |

FOREIGN PATENT DOCUMENTS

| | | |
|---|---|---|
| JP | H1147951 | 2/1999 |
| JP | 4248060 | 6/2000 |
| JP | 2003145280 | 5/2003 |
| JP | 2015104743 | 6/2015 |
| WO | 2010051104 | 5/2010 |
| WO | 2014118435 | 8/2014 |

OTHER PUBLICATIONS

Canadian Office Action Appln. No. 2,964,928 dated Jan. 29, 2020 (5 pgs).

European Office Action Appln. No. 17174248.9 dated Mar. 25, 2020 (5 pgs.).

Jiqing Gu, et al., "Quick Check Manual of 550 Cases of Welding Technology Essentials", Shanghai Science and Technology Press, Jun. 30, 2013, p. 303 (A type reference) (3 pages).

Miller, "Millermatic 211 Owner's Manual", https:llwww.millerwelds.com/files/ownersmanuals/0265809B_MIL.pdf, Jan. 2016 (2016) (52 pages).

Office Action, dated Dec. 10, 2020, for Canadian Patent Application No. 2,964,928 (11 pages).

ILMO Products Company: "TIG Welding Charts I ILMO Products Company", May 12, 2016 (May 12, 2016), XP093033653, Retrieved from the Internet: URL:http://web.archive.org/web/20160512192731/https://ilmoproducts.com/tig-welding-charts/ [retrieved on Mar. 22, 2023].

Hobart Brothers Co.: "Hobart Handler 210 MVP Specification Sheet", Mar. 31, 2016 (Mar. 31, 2016), XP093033656, Retrieved from the Internet: URL:http://web.archive.org/web/20161129165613ifj http://www.hobartwelders.com/pdf/spec_sheets/Handler_210MVP.pdf [retrieved on Mar. 22, 2023].

European Patent Office, Office Action, Application No. 17174248.9, dated Mar. 27, 2023, 6 pages.

* cited by examiner

Steel Wire Welding (MIG/Flux-Cored) Parameters

Aluminum Wire Welding (MIG) Parameters

Steel Wire Welding (MIG/Flux-Cored) Parameters

Aluminum Wire Welding (MIG)

Steel Wire Welding (MIG/Flux Cored) Parameters

120 Volt

| Material | Polarity | Wire Size | 18 ga (v/wfs) | 16 ga (v/wfs) | 14 ga (v/wfs) | 1/8" (v/wfs) | 3/16" (v/wfs) | 1/4" (v/wfs) | 24 ga (v/wfs) | 22 ga (v/wfs) |
|---|---|---|---|---|---|---|---|---|---|---|
| Stainless Steel | DCEP | .024 | 18.6/234 | 19.2/421 | 18.6/497 | 22.2/520 | - | - | - | 18.2/275 |
| | | .030 | 17.9/319 | 18.6/351 | 20.6/423 | 21.0/505 | - | - | - | 17.0/249 |
| | | .035 | 19.2/281 | 18.2/213 | 18.5/260 | 19.3/282 | - | - | - | 17.8/121 |

Aluminum Wire Welding (MIG)

170 Volt

| Material | Shielding | Wire Size | 18 ga (v/wfs) | 16 ga (v/wfs) | 14 ga (v/wfs) | 1/8" (v/wfs) | 3/16" (v/wfs) | 1/4" (v/wfs) | 24 ga (v/wfs) | 22 ga (v/wfs) |
|---|---|---|---|---|---|---|---|---|---|---|
| Alum. w/Optional Spoolmate 100 | DCEP | .030 | 10.8/235 | 12.8/410 | 13.9/410 | 21.0/444 | - | - | - | - |
| | | .035 | 10.8/283 | 13.0/333 | 14.3/350 | 20.7/350 | - | - | - | - |
| Alum. w/Optional Spoolmate 150 | DCEP | .030 | 10.8/283 | 12.8/887 | 13.8/440 | 21.0/444 | - | - | - | - |
| | | .035 | | 13.0/333 | 14.3/350 | 20.7/350 | - | - | - | - |
| Alum. w/Optional Spoolmate 150 | DCEP | .030 | 10.0/374 | 13.7/484 | 14.0/534 | 20.8/600 | - | - | - | - |
| | | .035 | | 13.6/383 | 14.5/450 | 19.6/504 | - | - | - | - |

TIG Welding Parameters

120 Volt

| Material | Shielding | Tungsten Size | 18 ga (Amps) | 16 ga (Amps) | 14 ga (Amps) | 1/8" (Amps) | 3/16" (Amps) | 1/4" (Amps) | 24 ga (Amps) | 22 ga (Amps) |
|---|---|---|---|---|---|---|---|---|---|---|
| Steel, Stainless Steel | Argon | 1/16" | 50 | 60 | 75 | 125 | 15? | - | 27 | 30 |
| | | 3/32 | 50 | 60 | 75 | 125 | 15? | - | 27 | 30 |

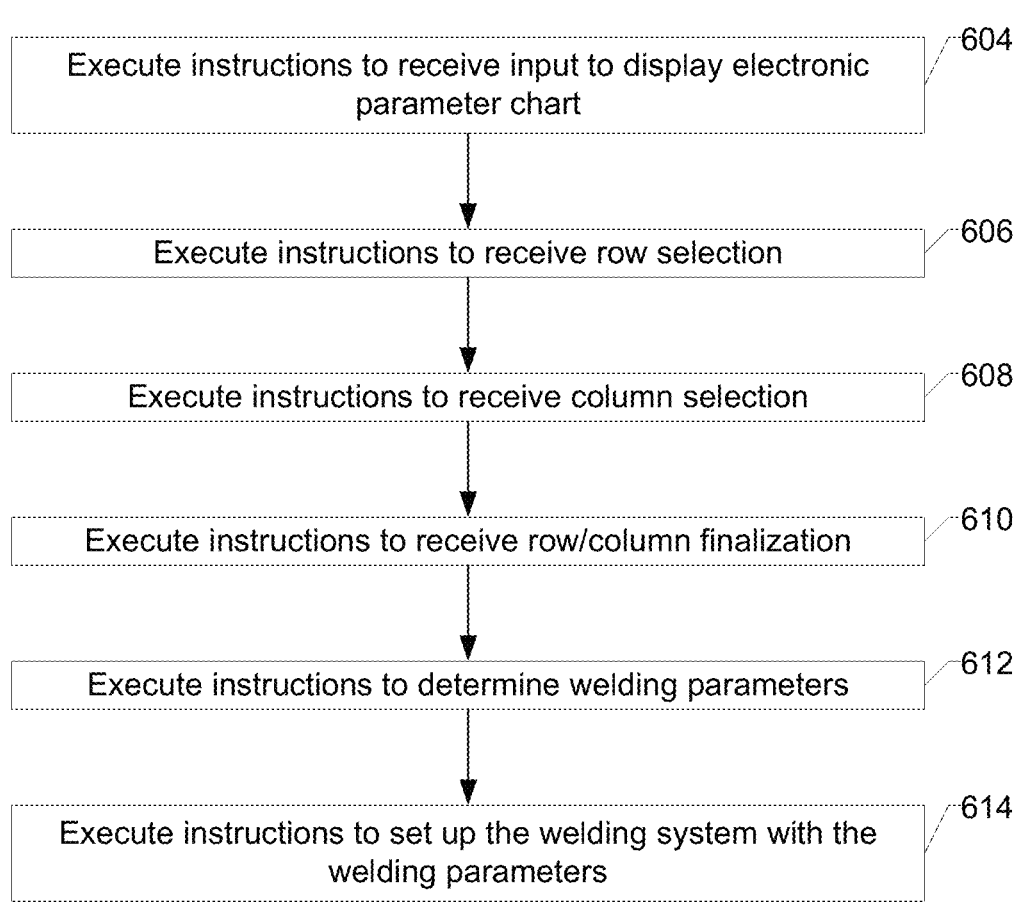

604
Execute instructions to receive input to display electronic parameter chart

606
Execute instructions to receive row selection

608
Execute instructions to receive column selection

610
Execute instructions to receive row/column finalization

612
Execute instructions to determine welding parameters

614
Execute instructions to set up the welding system with the welding parameters

FIG. 6

METHOD AND APPARATUS FOR SETTING UP WELDING PARAMETERS

BACKGROUND

The present disclosure relates to a welding machine, and more particularly, to a method and apparatus for setting up welding parameters.

Limitations and disadvantages of conventional approaches to welding will become apparent to one of skill in the art, through comparison of such approaches with some aspects of the present method and system set forth in the remainder of this disclosure with reference to the drawings.

SUMMARY

Methods and systems are provided for setting up welding parameters, substantially as illustrated by and described in connection with at least one of the figures, and as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

FIG. 4A is an illustration of an output display of a user interface displaying an exemplary electronic parameter chart, in accordance with aspects of this disclosure.

FIG. 4B is an illustration of an output display of a user interface displaying an exemplary electronic parameter chart, in accordance with aspects of this disclosure.

FIG. 4C is an illustration of an output display of a user interface displaying a portion of an exemplary electronic parameter chart, in accordance with aspects of this disclosure.

FIG. 4D is an illustration of an output display of a user interface displaying a portion of an exemplary electronic parameter chart, in accordance with aspects of this disclosure.

FIG. 4E is an illustration of an output display of a user interface displaying a portion of an exemplary electronic parameter chart, in accordance with aspects of this disclosure.

FIG. 6 is a flowchart illustrating example instructions 600 that may be executed by a welding processor for setting up welding parameter, in accordance with aspects of this disclosure.

DETAILED DESCRIPTION

Figure 1:
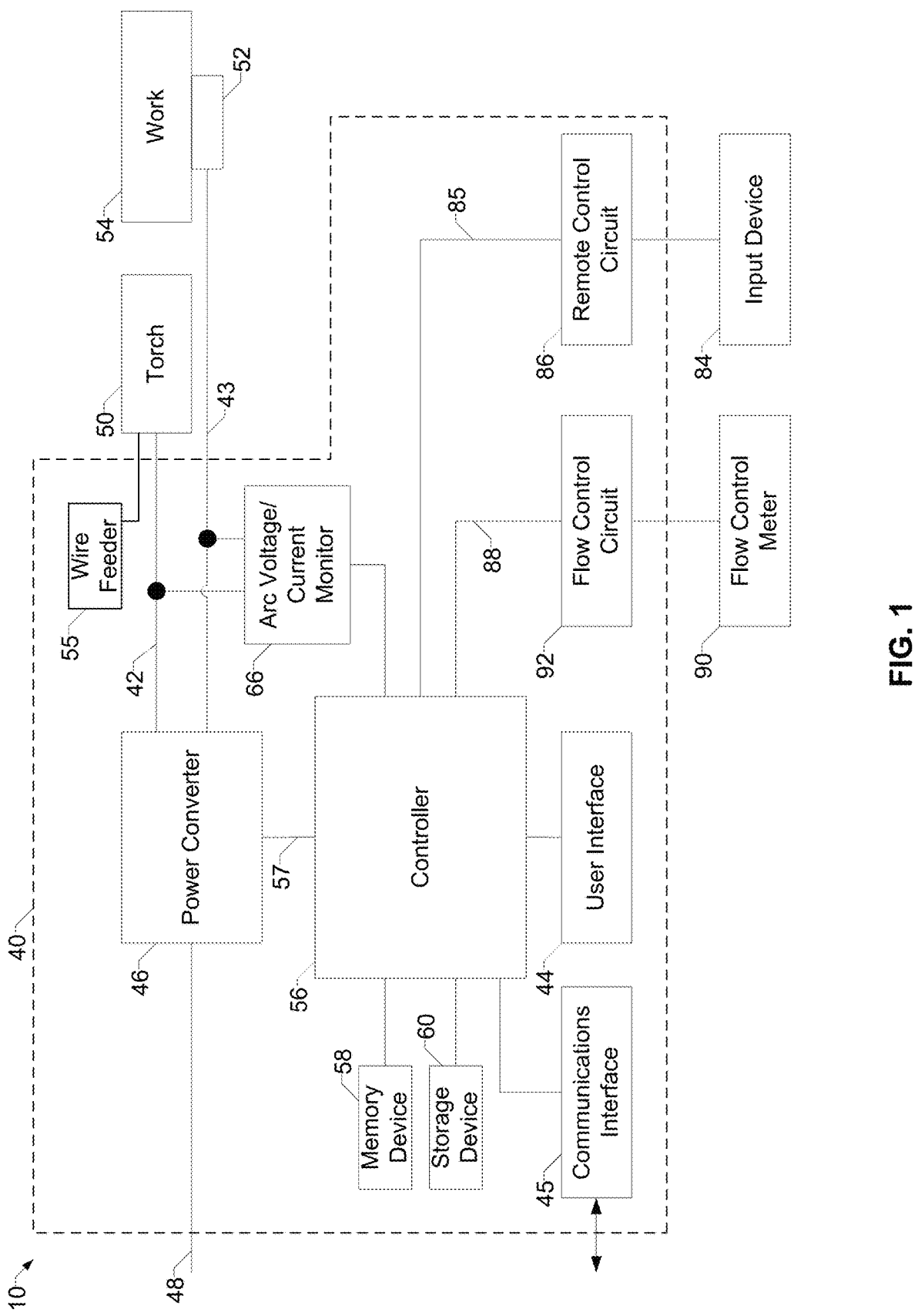
FIG. 1 shows an exemplary welding system in accordance with aspects of this disclosure.

Welding power, as used herein, refers to power suitable for welding, plasma cutting, induction heating, air carbon-arc cutting and/or gouging (CAC-A), cladding, and/or hot wire welding/preheating (including laser welding and laser cladding).

A welding system, as used herein, may comprise any device capable of supplying welding power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Various embodiments of the disclosure can comprise a welding system that includes a display device configured to display an electronic parameter chart and a user interface configured to receive a row input to select a row of the electronic parameter chart and/or a column input to select a column of the electronic parameter chart. The welding system also includes a welding power supply configured to provide welding power, and a welding processor configured to control welding parameters based on the selected row and the selected column. The welding system can also comprise a wire feeder configured to feed electrode wire. The welding parameters can comprise at least one of welding voltage, wire feed speed, and welding current (welding amperage).

The display device is configured to display at least a portion of the electronic parameter chart. The display device may be further configured to display a first portion of the electronic parameter chart, and to display a different portion of the electronic parameter chart based on display input received via the user interface. The different portion of the electronic parameter chart can include a portion of the first portion of the electronic parameter chart.

The display input may comprise at least one of a first display input for controlling display of the rows of the electronic parameter chart and a second display input for controlling display of the columns of the electronic parameter chart.

The welding processor is configured to control a welding operation according to the welding parameters, and the welding processor may also be configured to update the electronic parameter chart. The welding processor may also be configured to format the electronic parameter chart for the display device based on a readability setting.

The row input can be a first selection of at least one of a workpiece material, a tungsten type, a tungsten size, an electrode type, an electrode size, an electrode wire type, a shielding gas composition, a shielding gas flow rate, an electrode wire diameter, arc start, wire inductance, and a workpiece thickness. The column input can be a second selection of at least one of the workpiece material, the tungsten type, the tungsten size, the electrode type, the electrode size, the electrode wire type, the shielding gas composition, the shielding gas flow rate, the electrode wire diameter, arc start, wire inductance, and the workpiece thickness, where the second selection is different from the first selection. That is, the first selection and the second selection do not include the same variable(s). The order of selection may also be column input first, and row input second or vice versa depending on an embodiment.

The welding processor can be configured to finalize the selected row and the selected column in one of many different ways. Finalization of the selected row and the selected column can be used to set the welding parameters. For example, the selected row and the selected column may be finalized immediately upon selection of one or both of the row and the column, or after a pre-determined time after receiving one or both of the selected row and the selected column. The finalization may also occur, for example, when the user enters a selection input via the user interface. The welding processor may also finalize after receiving at least one of the selected row and selected column and receiving a selection input via the user interface.

In some embodiments, the welding processor may set the welding parameters whenever the selection input is received even without having received a selected row or column. The welding parameters may then correspond to the initial row and column that are shown highlighted on the display. Alternatively, the welding processor may display an error message, or warning, asking the user to select at least one of the row and column if the selection input is received without having received a selected row or a selected column.

Various embodiments of the disclosure may also comprise a non-transitory machine-readable medium storing machine executable instructions that when executed causes a computing system to control operations for setting up and controlling a welding system, comprising displaying an electronic parameter chart on a display device of the welding system. The electronic parameter chart relates at least one of welding voltage, wire feed speed, and welding current (welding amperage) to characteristics of a welding operation. The executed instructions can also control receiving, via a user interface of the welding system, a row input to select a row of the electronic parameter chart displayed on the display device, and a column input to select a column of the electronic parameter chart displayed on the display device. The selected row and the selected column may indicate the characteristics of the welding operation. The executed instructions also allow a welding processor to set welding parameters comprising at least one of a welding voltage, a wire feed speed, and welding current (welding amperage) based on the selected row and the selected column.

The executed instructions allow displaying the electronic parameter chart, which may comprise displaying at least a portion of the electronic parameter chart. The welding processor can execute the machine executable instructions to control the welding operation according to the welding parameters and/or to update the electronic parameter chart. The executed instructions may also allow for finalizing the welding parameters via at least one of a pre-determined time after receiving both of the selected row and the selected column, and receiving a selection input via the user interface of the welding system.

FIG. 1 is a block diagram illustrating an example welding system 10 including a power source 40. The power source 40 converts input power to AC and/or DC power suitable for use in welding operations, such as metal inert gas (MIG) welding, tungsten inert gas (TIG) welding, stick welding, and/or Submerged Arc Welding (SAW), and/or in gouging operations such as air carbon arc gouging. The power source 40 permits an operator to use the power source 40 for gouging and/or welding by selecting the appropriate operation via a user interface 44, and attaching the appropriate welding equipment, (e.g. a gouging torch and gas supply for air carbon arc gouging, wire feeder for MIG welding, a torch, gas supply for TIG welding, an electrode holder for STICK welding, etc.).

The power source 40 includes a power converter 46. The power converter 46 receives input power from a power input 48 and converts the power input 48 to either AC and/or DC welding power for output to a torch 50 connected to power outputs 42, 43. In the example of FIG. 1, the torch 50 is connected to the power output 42 and a work clamp 52 is connected to a power output 43 to form an electrical circuit with a workpiece 54 when an electrical arc is started. The arc voltage/current monitor 66 monitors the current and/or voltage of the power to the torch 50.

The power converter 46 is a phase-controlled power source, which may use silicon controlled rectifiers (SCRs) to convert power received at power input 48 to usable welding and/or gouging power. Additionally or alternatively, the power converter 46 may use DC chopper circuity and/or any other power conversion topology.

The power source 40 includes a controller 56 that is operatively coupled to the power converter 46. The controller 56 may also be referred to as a welding processor. The controller 56 may be implemented using one or more logic circuits, such as one or more "general-purpose" microprocessors, one or more special-purpose microprocessors and/or application-specific integrated circuits (ASIC), field programmable gate arrays (FPGA)s, digital signal processors (DSPs), and/or any other type of logic and/or processing device. For example, the controller 56 may include one or more digital signal processors (DSPs). Alternatively, the controller 56 could include discrete component control circuitry to perform these control functions. The controller 56 controls the output power from power converter 46 by generating control signals 57 to control switching components (e.g., the SCRs) in power converter 46.

The controller 56 receives user-selected operating parameters from user interface 44, such as welding current (welding amperage) selection. For example, the user interface 44 includes selectors (not shown) operable by the user to select a welding process (e.g., gouging, MIG, TIG, STICK, etc.), a welding current (welding amperage) control (PANEL/REMOTE), an output control (ON/REMOTE), a start mode (OFF/LIFT/HFSTART/HFCONT), a positive/negative balance control for AC TIG welding, a DIG control for STICK welding, a welding current (welding amperage) level, a spot welding operation, and/or a sequence selection such as start current, final (crater) current, or both. The controller 56 also transmits to the user interface 44 information about the welding operation that is valuable to the welder, including arc voltage, arc current (arc amperage), and/or preferred selector settings. The example user interface 44 may include any type of interface device, such as a keyboard, a pointing device (e.g., a mouse, a trackpad), a microphone, a camera (e.g., gesture-based input), a touchscreen, and/or any other type of user input and/or output device.

The controller 56 may also be configured to control various aspects of the welding system 10. For example, the controller 56 may control input and output via the user interface 44 and/or the communications interface 45. As described above, the controller 56 may generically refer to a plurality of devices, including processors, which work in concert to control various aspects of the welding system 10.

In some examples, the welding system 10 may receive information via the communication interface 45. The communication interface 45 may receive information such as, for example, updates to any software/firmware that may be used by the welding system 10 or the welding current (welding amperage) parameter from another device instead of via the user interface 44. For example, the information such as the welding current (welding amperage) parameter may be received via a wired and/or wireless communication from a computing device (e.g., a computer, a server, a mobile device, cloud storage, etc.), a wired and/or wireless point-to-point connection (e.g., Bluetooth®, near-field communications, USB, etc.), a control cable communication with another welding device, a weld cable communication from another welding device, a communication with a storage device such as a portable storage device (e.g., a FLASH drive or other USB-capable storage, a secure digital (SD) card, etc.), and/or via any other communications method.

Various embodiments of the disclosure may also transmit information via wired and/or wireless communication. The transmitted information may be, for example, commands, status, and/or other information that may be requested by other devices/servers/etc. The information communicated between the welding system 10 and another device may also be, for example, to allow control of the welding system 10 by another device.

A memory device 58 and a storage device 60 are coupled to the controller 56 for storing data including the settings of the selectors on user interface 44 for future retrieval after power-down and/or between welding cycles. The memory device 58 may include a volatile memory, such as random access memory (RAM), and/or a nonvolatile memory, such as read-only memory (ROM). The storage device 60 may include magnetic media such as a hard disk, solid state storage, optical media, and/or any other short and/or long term storage device. The memory device 58 and/or the storage device 60 may store information (e.g., data) for any purpose and/or transmit stored data upon request by the controller 56. For example, the memory device 58 and/or the storage device 60 may store processor executable instructions (e.g., firmware or software) for the controller 56 to execute. In addition, one or more control schemes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation.

The memory device 58 may include a volatile memory, such as random access memory (RAM), and/or a nonvolatile memory, such as read-only memory (ROM). The memory device 58 may store a variety of information and may be used for various purposes. For example, the memory device 58 may store processor executable instructions (e.g., firmware or software) for the controller 56 to execute. In addition, one or more control regimes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation.

The controller 56 also receives remote control inputs 85 from an input device 84 through a remote control circuit 86. The input device 84 is user-operable and can be used to control welding power output. The flow of shield gas and/or gouging gas may also be controlled by controller 56. In this embodiment, a control signal 88 is sent from controller 56 via a path through a flow control circuit 92 to a flow control meter 90. Flow control meter 90 is coupled to a gas supply (not shown) for regulating the flow of shield gas and/or gouging gas from the gas supply to a welding site (e.g., to the torch 50). The flow control meter 90 may be internal or external to the power source 40 with a gas flow channel (not shown) extending from the gas supply, through power source 40, through flow control meter 90, then out to the 50 for provision to the site of the operation. The flow control circuit 92 could also be a submerged arc flux controller or a flux hopper controller.

The welding system 10 may also comprise a wire feeder 55 that is configured to feed electrode wire to the torch 50 as needed. For example, during metal inert gas (MIG) welding the wire feeder 55 can feed welding electrode wire to the torch 50. The wire feeding rate may be determined by, for example, the controller 56.

Figure 2:
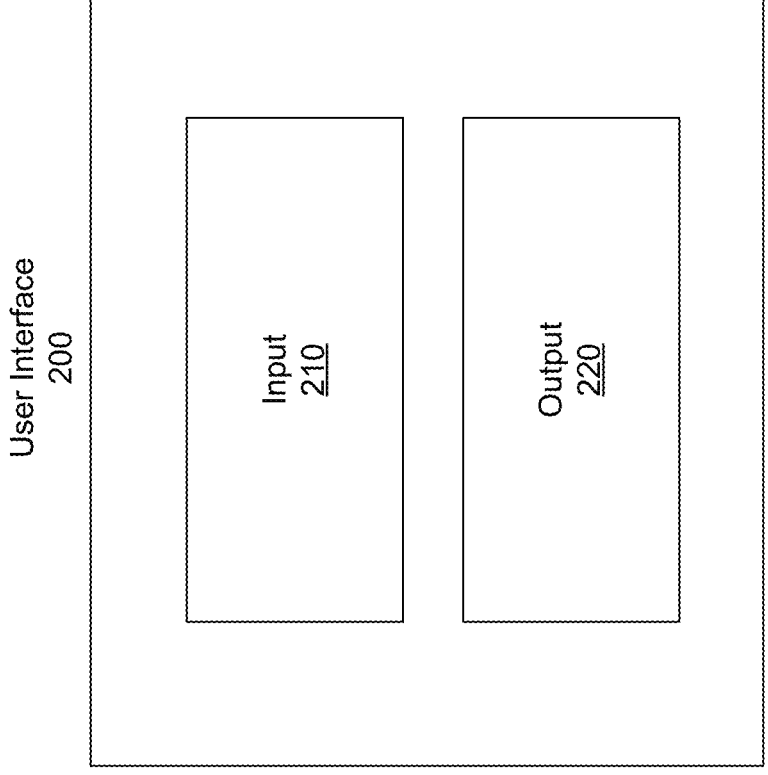
FIG. 2 is a block diagram of an exemplary user interface, in accordance with aspects of this disclosure.

FIG. 2 is a block diagram of an exemplary user interface, in accordance with aspects of this disclosure. Referring to FIG. 2, there is shown the user interface 200 comprising the input interface 210 and the output interface 220. The user interface 200 may be similar to the user interface 44 of FIG. 1. The input interface 210 can comprise many typed of interface devices, such as a keyboard, a pointing device (e.g., a mouse, a trackpad), a microphone, a camera (e.g., gesture-based input), a touchscreen, buttons that can be rotated and/or pushed, sliding knobs, and/or any other type of user input device. The output interface 220 can comprise any type of visual output device such as, for example, an LCD display, an LED display, etc., tactile feedback devices that may vibrate, audio output device such as speakers, and any other output devices that may be used to provide information or notice.

While the user interface 200 shows the input interface 210 and the output interface 220 as being separate, this depiction is strictly for ease of explanation and is not meant to limit various embodiments of the disclosure.

Figure 3:
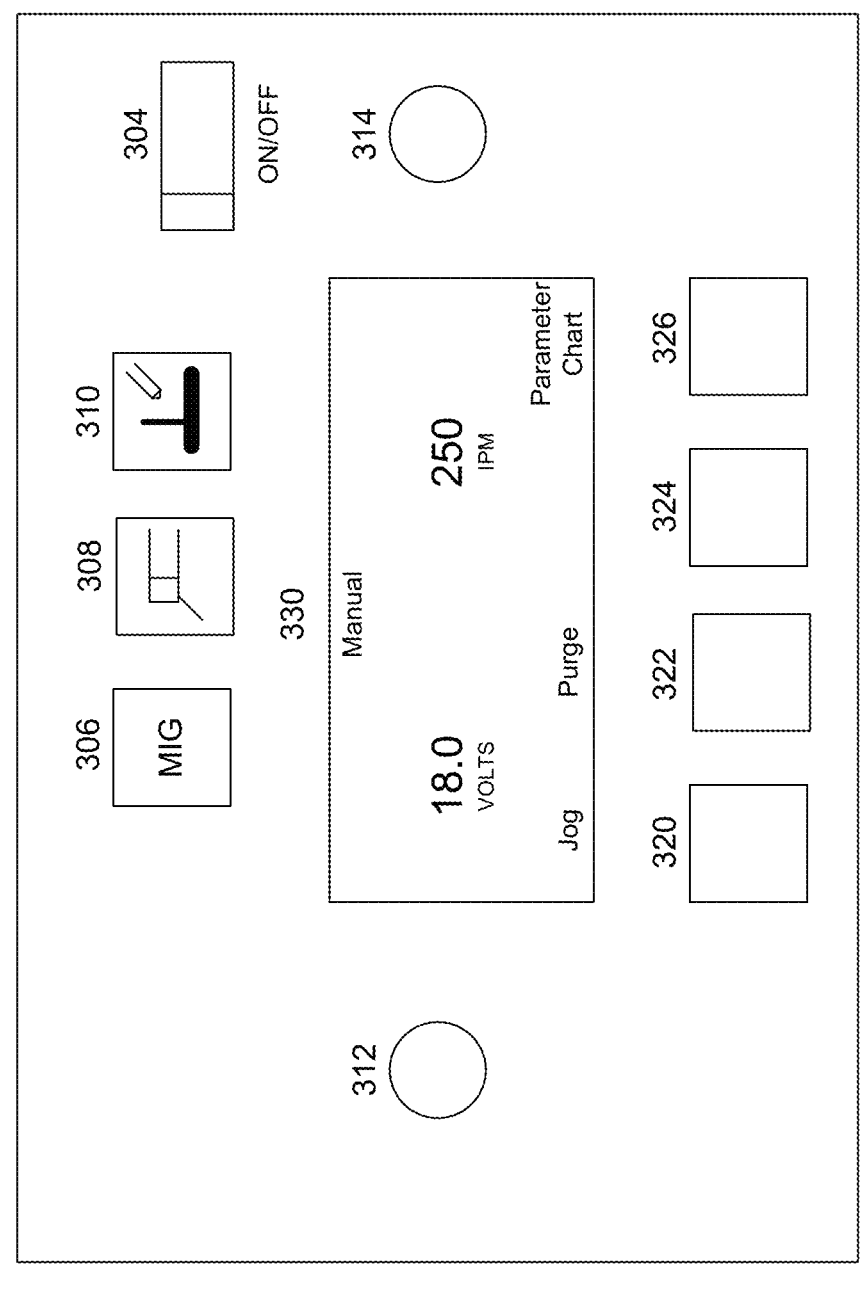
FIG. 3 is a diagram of an exemplary user interface, in accordance with aspects of this disclosure.

FIG. 3 is a diagram of an exemplary user interface, in accordance with aspects of this disclosure. The exemplary user interface 300 of FIG. 3 may be similar to the user interfaces 44 and 200. The user interface 300 comprises, for example, an on/off switch 304, selector buttons 306, 308, 310, 320, 322, 324, and 326, the control knobs 312 and 314, and the display 330.

The on/off switch 304 is used to turn the welding system 10 on or off. The selector buttons 306, 308, and 310 enable selection and/or deselection of, for example, a specific type of welding process. The welding process selected may be, for example, metal inert gas (MIG), tungsten inert gas (TIG), etc. In some embodiments pushing one of the selector buttons 306, 308, 310 deselects the other two selector buttons. Other embodiments may operate each selector button semi-independently where the present selector button that is selected needs to be deselected before another selector button can be selected.

The control knob 312 adjusts the welding voltage, and the control knob 314 adjusts the wire feed speed or welding current (welding amperage) if applicable. The functions of the control knobs 312 and 314 may vary depending on situations. For example, if a parameter entry mode is selected by, for example, pressing the selector button 326 below the text "Parameter Chart," an electronic parameter chart may be displayed on the display 330. The control knobs 312 and 314 can then be used, for example, to control the portion of the electronic parameter chart 400 that is displayed on the display 330 (to be described in FIG. 4A to FIG. 5). The control knobs 312 and 314 may be turned in either direction, or may be toggled in either direction. When toggled, the control knobs 312 and 314 scroll the electronic parameter chart 400 one or more rows and/or columns, respectively, with each toggle.

Various embodiments of the disclosure allow the control knobs 312 and 314 to select the appropriate variables and finalize those variables without further input to determine the welding parameters. Other embodiments of the disclosure may have the user press a button, such as, for example, the selector button 324 or the selector button 326 in order to finalize the variables for determining the welding parameters for use with the welding system 10.

The selector buttons 320, 322, 324, and 326 may be "soft" selector buttons that can be programmed to different functions. For example, the selector buttons 320 and 322 may control jog and purge functionalities, respectively, of the welding system 10. The selector button 324 may be used display different options for the soft buttons 320, 322, 324, and 326. The selector button 326 may be used to display an electronic parameter chart on the display 330.

The display 330 outputs status and/or instructions for the user of the welding system 10. The display 330 can output, as stated above, the electronic parameter chart 400 where a user can make selections of variables for determining the welding parameters for use in the operation of the welding system 10. In various embodiments of the disclosure, the electronic parameter chart 400 is displayed to allow the user to select a row and a column with appropriate variables, and the intersection of the row and the column may be used to determine the welding parameters to be used for operation of the welding system 10. The row can display, for example, the type of material being welded (material the workpiece is made of), the type of wire and its size, the shielding gas and its flow rate, and/or the polarity of the power to the welding torch. The column can display, for example, the thickness of the workpiece to be welded. Other variables, such as, for example, arc starts and inductance that may each be specific for each row can also be specified as needed. Arc starts and inductance can be selected to optimize the transfer of welding arc and its penetration and weld profile.

When in a normal operating mode, the display 330 can show, for example, the presently set welding voltage and wire feed speed parameters for the welding system as appropriate when MIG welding is being performed. As shown in an example in FIG. 3, the present welding voltage is 18.0 volts and the present wire feed speed is 250 inches per minute. Various embodiments may display welding current (welding amperage) when TIG welding is being performed. Other parameters may be displayed as appropriate for the type of welding being performed.

While some variables to be specified for a welding job are mentioned above, it should be understood that various embodiments of the disclosure may update the electronic parameter chart 400 to add and/or change the variables for the rows and columns.

Figure 4A:
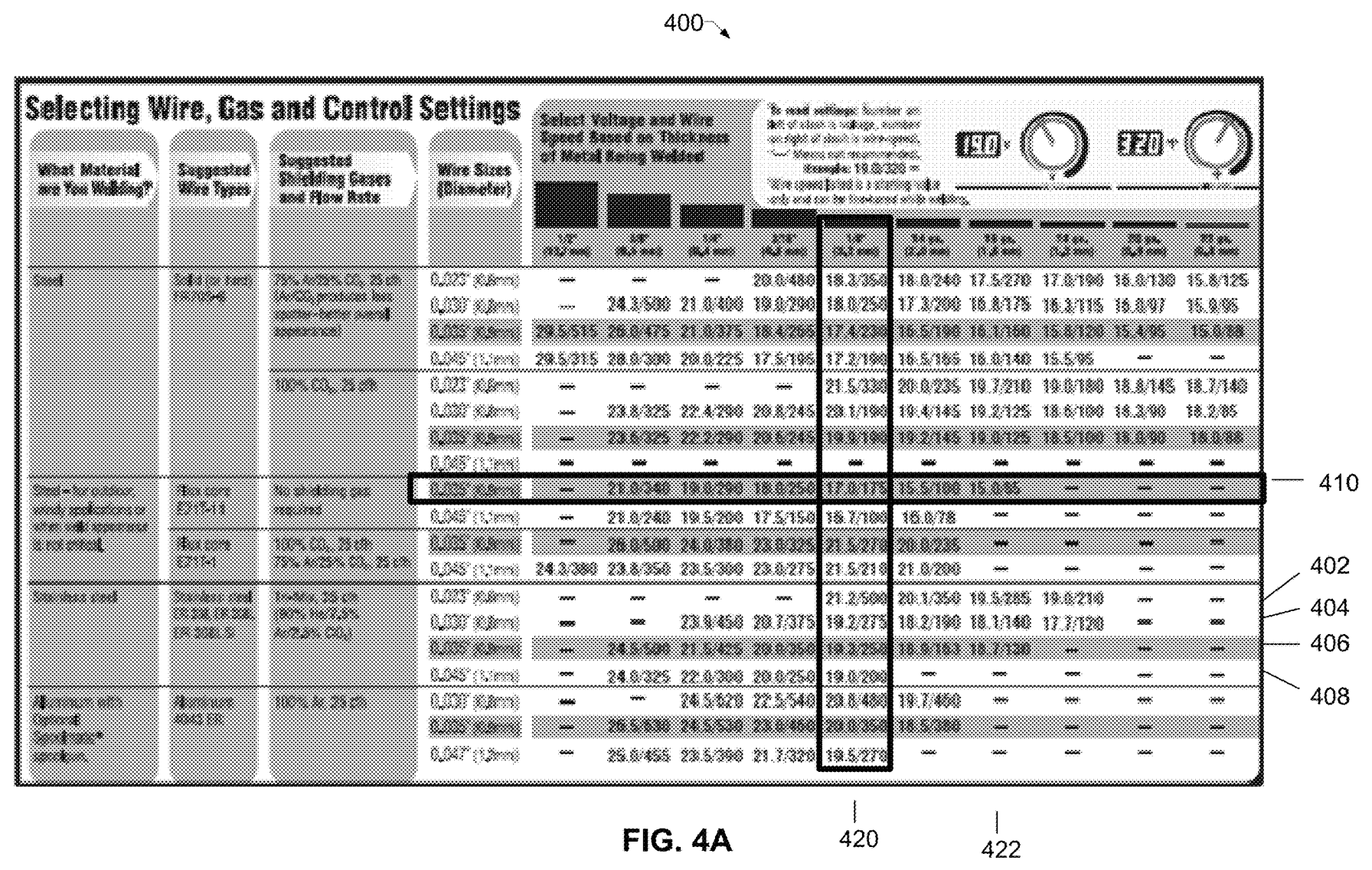

FIG. 4A is an illustration of an output display of a user interface displaying an exemplary electronic parameter chart, in accordance with aspects of this disclosure. Referring to FIG. 4A, the electronic parameter chart 400 output on the display 330 of the welding system 10 comprises a plurality of rows where each row indicates the workpiece material type, tungsten type, tungsten size, electrode type, electrode size, the electrode wire type, the shielding gas composition, the shielding gas flow rate, and the electrode wire diameter, and the plurality of columns each indicate the workpiece thickness. Depending on the type of welding to be performed, there may be other variables indicated in the rows and columns.

In an embodiment of the disclosure, the electronic parameter chart 400 displayed on the display 550 comprises a highlighted row portion 410 and a highlighted column portion 420. The intersection of the highlighted row portion 410 and the highlighted column portion 420 is used to determine the welding parameters. Accordingly, a user would move the electronic parameter chart 400 up or down, and sideways to align the desired row with the highlighted row portion 410 and the desired column with the highlighted column portion 420.

For example, if 16 gauge stainless steel is to be welded, there are 4 rows 402, 404, 406, and 408 shown on the exemplary electronic parameter chart 400 that correspond to welding stainless steel and one column 422 corresponding to 16 gauge stainless steel. In this case, there is one suggested electrode wire type and one shielding gas composition at one flow rate. The user may then select the electrode wire diameter. The electrode wire diameters presented for stainless steel are 0.023", 0.030", 0.035", and 0.045" corresponding to rows 402, 404, 406, and 408. The user may select, for example, row 406 for the electrode wire diameter of 0.035" and column 422 for the 16 gauge stainless steel workpiece that is to be welded.

Accordingly, the user would move the rows up until the row 406 aligns with the highlighted row portion 410, and the columns sideways until the column 422 aligns with the highlighted column portion 420. After the user finalizes the selected row and the selected column, the controller 56, for example, of the welding system 10 may set the welding voltage and wire feed speed to appropriate values.

Although certain variables are mentioned above, the disclosure need not be limited to only these variables. Other variables may be introduced as welding technology/methodology changes, as new material are added to the list of materials that can be welded, as new welding wires are developed, etc. Accordingly, the electronic parameter chart 400 may be updated in part, or replaced entirely. For example, if different thicknesses are to be supported, the electronic parameter chart 400 may be updated with the additional information. However, if a whole new set of materials are to be supported, or a new type of welding technique is to be used, the electronic parameter chart 400 may be updated in its entirety. Alternatively, an electronic parameter chart 400 may be supplemented with one or more of the electronic parameter charts so that an appropriate electronic parameter chart can be displayed on the display 330 for different needs.

Additionally, while a specific configuration was described for entering command/information, the disclosure need not be limited so. The entry mode may use any of the different entry modes that are presently known or may be developed in the future. For example, the entry may be via voice, or mouse or track ball, a touch screen that is a part of the display 330, a keyboard, etc.

Figure 4B:
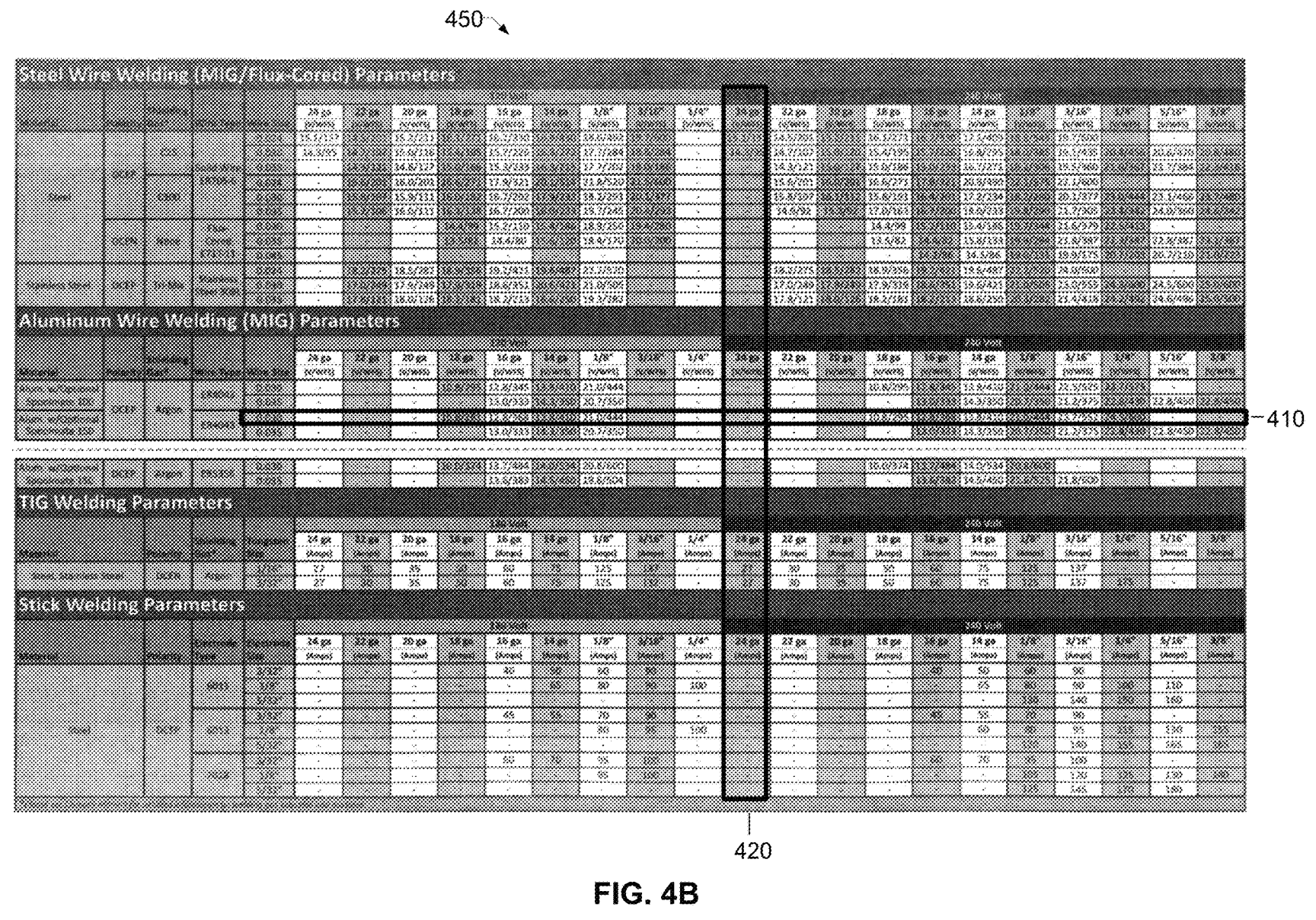

FIG. 4B is an illustration of an output display of a user interface displaying an exemplary electronic parameter chart, in accordance with aspects of this disclosure. Referring to FIG. 4B, there is shown an electronic parameter chart 450 output on the display 330 of the welding system 10 that is different than the electronic parameter chart 400 of FIG. 4A. There is shown the highlighted row portion 410 and the highlighted column portion 420. The electronic parameter charts 400 and 450 may have been downloaded to the welding system 10 and stored in the memory device 58 or the storage device 60. When there are multiple welding parameter charts stored in the welding system 10, an embodiment of the disclosure may allow, for example, the selector button 324 to display a different electronic parameter chart each time the selector button 324 is pressed. Accordingly, since there are two electronic parameter charts 400 and 450, each press of the selector button 324 will display the electronic parameter charts 400 and 450 in turn. Various embodiments may have different methods of displaying the multiple welding parameter charts.

Figure 4C:
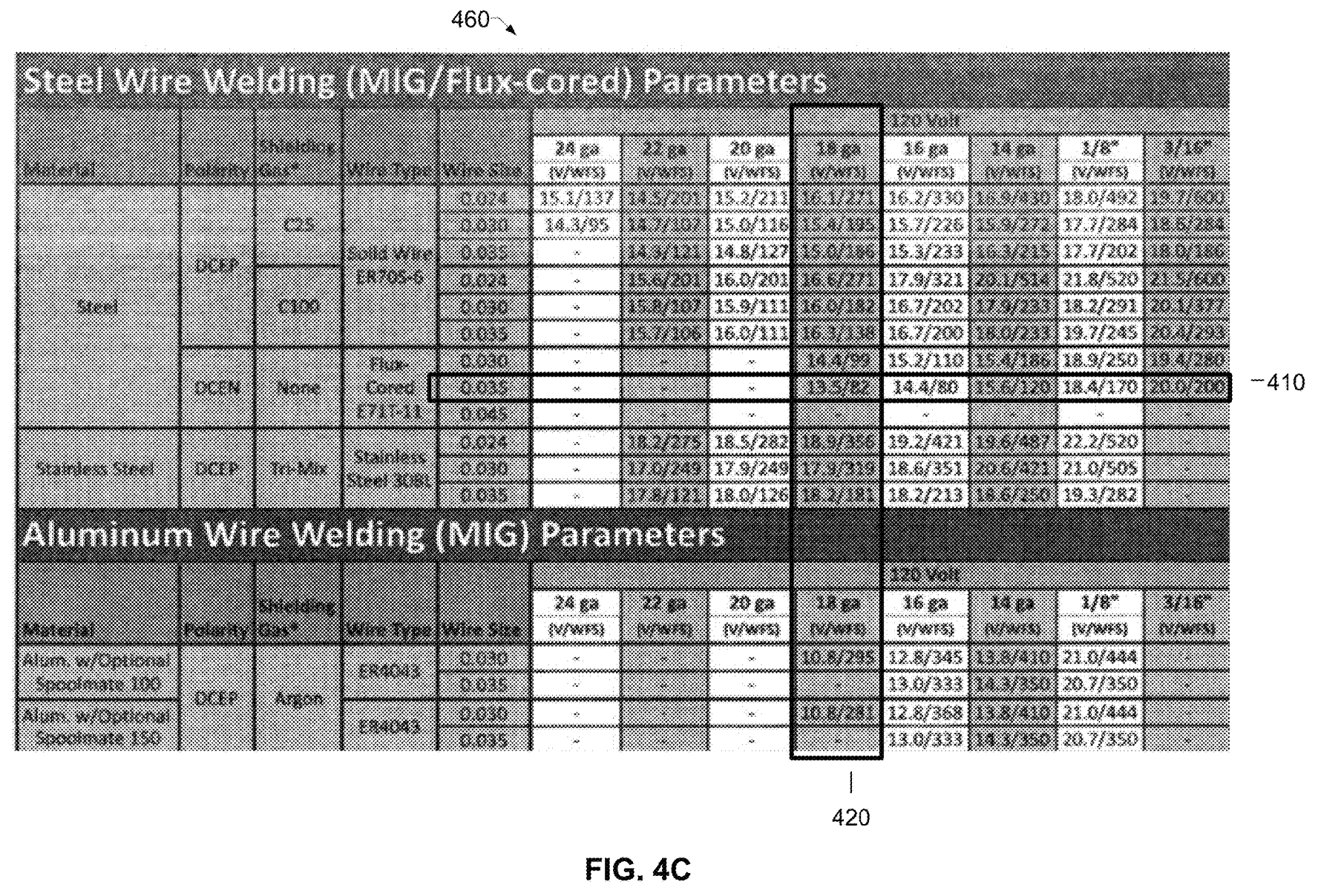

FIG. 4C is an illustration of an output display of a user interface displaying a portion of an exemplary electronic parameter chart, in accordance with aspects of this disclosure. Referring to FIG. 4C, there is shown a portion of the electronic parameter chart 450. This may occur, for example, if the display 330 is not large enough to show the entire electronic parameter chart 450. Various embodiments may also allow a larger font to be used for better viewing, thereby limiting the amount of the electronic parameter chart 450 that can be displayed on the display 330. There is also shown the highlighted row portion 410 and the highlighted column portion 420.

Figure 4D:
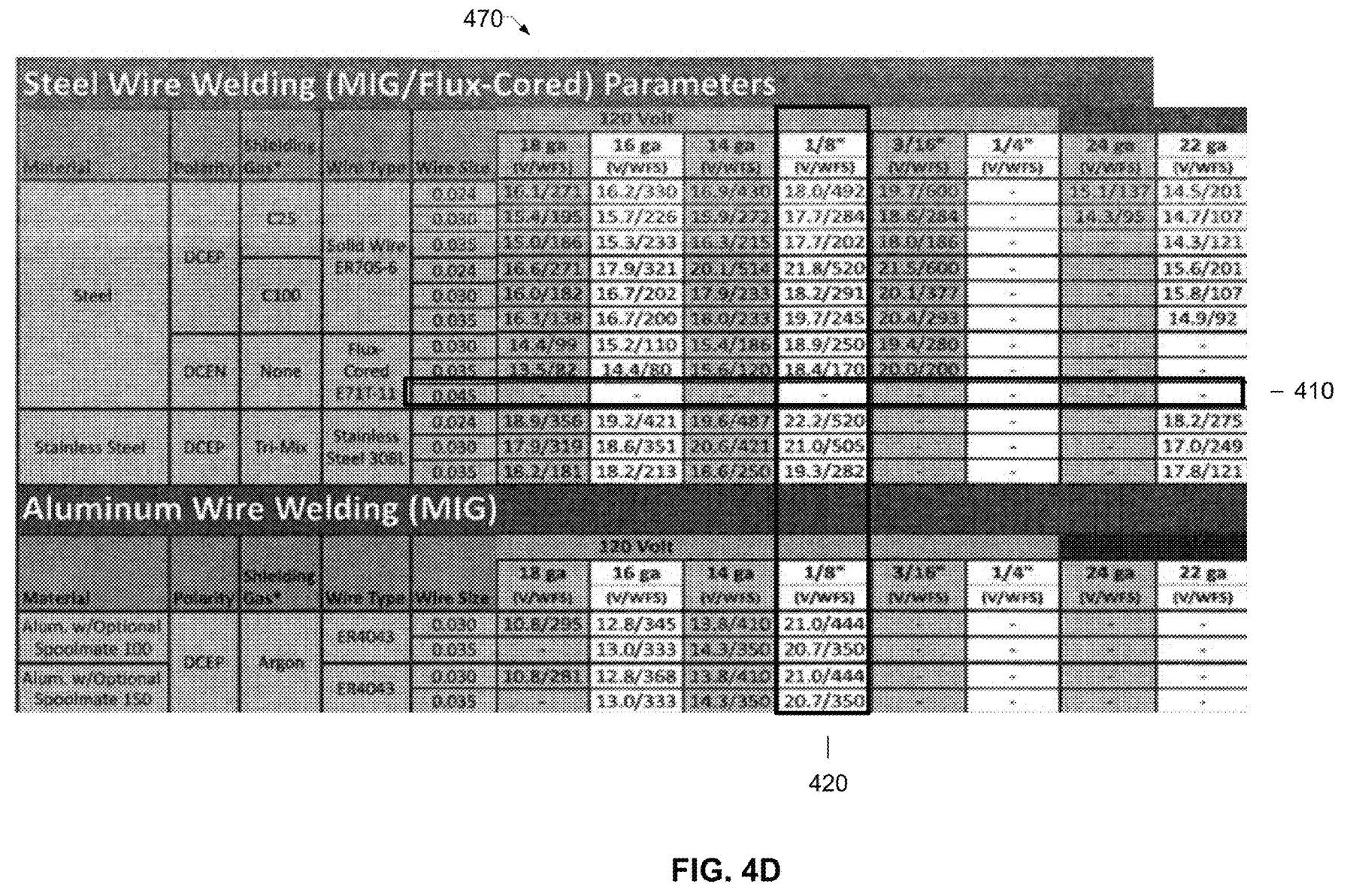

FIG. 4D is an illustration of an output display of a user interface displaying a portion of an exemplary electronic parameter chart, in accordance with aspects of this disclosure. Referring to FIG. 4D, there is shown a different portion of the electronic parameter chart 450 than shown in FIG. 4C. This portion is shown when the user moves to the columns on the right by, for example, manipulating the control knob 314.

FIG. 4E is an illustration of an output display of a user interface displaying a portion of an exemplary electronic parameter chart, in accordance with aspects of this disclosure. Referring to FIG. 4E, there is shown a different portion of the electronic parameter chart 450 than shown in FIG. 4D. This portion is shown when the user moves to the rows below by, for example, manipulating the control knob 312.

Figure 5:
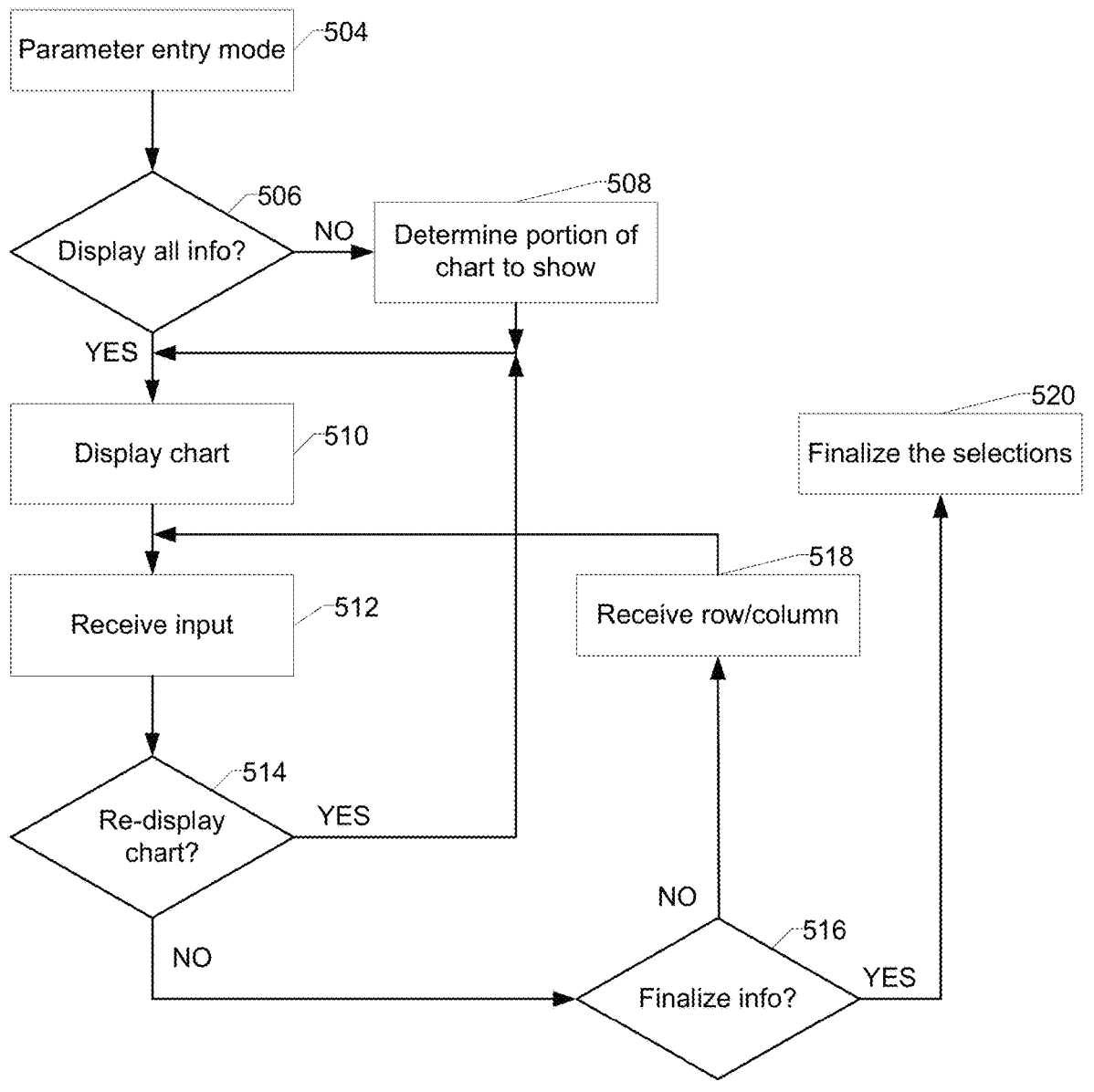
FIG. 5 is an exemplary flow diagram of operations for setting up welding parameters with an electronic parameter chart, in accordance with aspects of this disclosure.

FIG. 5 is an exemplary flow diagram for setting up welding parameters with an electronic parameter chart, in accordance with aspects of this disclosure. Referring to FIG. 5, there is shown exemplary process to implement setting up parameters for a welding system such as the welding system 10. Specific operations referring to an instruction will be with respect to the previously described descriptions and with respect to FIG. 1 through FIG. 4E.

At 504 the user presses the selector button 326 to display an electronic parameter chart so that parameter entries may be made. The electronic parameter chart may be similar to the electronic parameter chart 400 of FIG. 4A or 450 of FIG. 4B. The electronic parameter chart may be shown in its entirety, or a portion of the electronic parameter chart may be shown as explained with respect to FIGS. 4C, 4D, and 4E. The amount of the electronic parameter chart shown may depend on the size of the electronic parameter chart and/or a display setting for the electronic parameter chart. For example, different users may desire to have the electronic parameter chart displayed in different sized fonts or scale/ magnification depending on their vision or clarity of the environment. For example, if the air is smoky or hazy, the user may want to have larger fonts to make the electronic parameter chart easier to see.

The size of text/graphics on the display 330 may be controlled by, for example, two selector buttons 320 and 322. Each press of the selector button 320 may decrease the size of the text/graphics and each press of the selector button 322 may increase the size of the text/graphics. Any of various methods presently known, and different methods that may be developed in the future, may be used to change the size of the text/graphics displayed on the display 330.

At 506 a determination is made whether to display the entire electronic parameter chart or a portion of the electronic parameter chart. If a portion of the electronic parameter chart is to be shown, at 508 a determination is made of the portion to show. A default mode when showing a portion of the electronic parameter chart may be to show, for example, the top-left portion as illustrated in FIG. 5C. The electronic parameter chart is then shown at 510, whether in full when coming from 506 or a portion when coming from 508.

At 512 the user may operate input commands via the user interface 300. This may be to indicate a different part of the electronic parameter chart to be displayed, to move a row to the highlighted row portion 410 or a column to the highlighted column portion 420, or to finalize the selections of the row and column. The commands may be entered via, for example, the control knobs 312 and 314. The control knob

312 may be used, for example, to scroll vertically to view different portions of the electronic parameter chart. The control knob 314 may be used, for example, to scroll horizontally to view different portions of the electronic parameter chart 400. Accordingly, a user may be able to display all or a portion of the electronic parameter chart 400 on the display 330, and when viewing a portion of the electronic parameter chart 400, the user may be able to control showing portions of the electronic parameter chart 400 on the display 330. Various embodiments may use the control knob 314 to scroll vertically and the control knob 312 to scroll horizontally.

At 514 it is determined whether the electronic parameter chart needs to be redisplayed. If so, then the electronic parameter chart is re-displayed at 510. If not, it is determined in 516 whether the input was a finalize command from the user (e.g., by a selector button being pressed). If so, the selection(s) are finalized. If not, then at 518 the row or column information is saved and the next user input is received at 512. As explained above, in various embodiments of the disclosure, the display 330 may show, for example, a highlighted row portion 410 and a highlighted column portion 420 in the display 330. Moving a row and a column to the highlighted row portion 410 and highlighted column portion 420, respectively, may act to select that row and column. Accordingly, the inputs received from the user at 512 can indicate the desired row and the desired column.

If the received input is determined at 518 to be the finalize command, the controller 56 of the welding system 10 may then determine the appropriate parameters, such as, for example, the welding voltage and the wire feed speed, based on the finalized row and column.

Some embodiments of the disclosure do not require pressing a selector button to finalize the row and column selections. For example, some embodiments of the disclosure may finalize the row and column after the row has been moved to the highlighted row and the column has been moved to the highlighted column, either immediately upon selection of both the row and column, or after some pre- determined time following the selection of the row and column. In some embodiments, the row and column are automatically selected after a pre-determined time. Accord- ingly, the controller 56 of the welding system 10 finalizes the row and column after a pre-determined time, which may include a time of zero seconds, for selection of the welding parameters even with no movement of the row or column. For example, if the desired row and column are already highlighted, the pre-determined time may elapse and the row and column can be finalized. Or, even if only the row or the column is moved, the row and column can be finalized after a pre-determined time. If there is enough delay before moving a row and/or a column, there may be multiple finalizations. The last finalization will be used for operation of the welding system 10. As described, the user may also push, for example, a selector button to finalize the displayed row and column to determine the welding parameters.

Various embodiments of the disclosure may implement finalizing the row and column when, for example, a selector button is pushed or after a pre-determined time, which may include a time of zero seconds. However, some embodi- ments of the disclosure may not, for example, allow final- izing the row and column with pushing a selector button without selection of at least one of the row and column. This may be to ensure that a user did not press a selector button by mistake. Accordingly, the welding system 10 may pro- vide a notice or a warning via the output interface 220. For example, the notice may be one or more of a message displayed on the display 330, a tone via a speaker (not shown) in the output interface 220, an indicator light, which may be flashing, via an LED (not shown) in the output interface 220, and/or a vibration output via a haptic feedback device (not shown) in the output interface 220. Various embodiments of the disclosure may also use these and/or other means of notification.

Although some specific embodiments of the disclosure have been described in this specification and drawings, it should be understood that the disclosure is not limited to these specific embodiments.

FIG. 6 is a flowchart illustrating example instructions 600 that may be executed by a welding processor for setting up welding parameter(s), in accordance with aspects of this disclosure. The example instructions 600 may be stored on any of the non-transitory machine readable media described in FIG. 1, and/or executed by the controller 56 of FIG. 1. The example instructions 600 may be executed to perform a similar process as described in FIG. 5. Therefore, only a simplified description will be made with respect to FIG. 6.

The controller 56 may execute the example instructions 600 to set up welding parameters for the welding system 10 for use in welding a workpiece. At 604, the controller 56 executes instructions that detect a request to display, for example, the electronic parameter chart 400. The request may be, for example, pressing of the selector button 326. Accordingly, the controller 56 may execute instructions to display the electronic parameter chart 400. The controller 56 may also receive input, as described previously and with respect to previous FIGS. 1-5, for displaying different parts of the electronic parameter chart 400.

At 606, the controller 56 executes instructions that detect selection of a row, and at 608 the controller executes instructions that detect selection of a column. At 610, the controller 56 executes instructions to finalize the selected row and column by, for example, detecting pressing of a selector button and/or waiting a pre-determined time as described above with respect to FIG. 5. At 612, the controller 56 executes instructions to determine the welding parameters based on the finalized row and column. At 614, the controller 56 executes instructions to set up the welding system 10 with the appropriate welding parameters for welding the workpiece.

FIG. 6 shows a simplified flowchart for executing example instructions 600 for the sake of ease of illustration. As explained above with respect to FIGS. 1-6, instructions for various other functionalities may be executed for different embodiments of the disclosure. Accordingly, the example instructions 600 should not be construed to be limiting to any specific embodiment of the disclosure.

The present methods and systems may be realized in hardware, software, and/or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A combination of hardware and software may include a general-purpose computing system with a welding specific program or other code that, when being loaded and executed, controls the computing system such that it carries out the methods described herein. Another implementation may comprise one or more application specific integrated circuit or chip designed for welding. Some implementations may comprise a non-transitory machine-readable (e.g., computer readable) medium (e.g., FLASH memory, optical disk, puter readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

13

What is claimed:

1. A welding system comprising:
a display device configured to display an electronic parameter chart, wherein the electronic parameter chart comprises a plurality of rows that intersect a plurality of columns, a user interface configured to receive at least one of a row input to indicate a selected row from the plurality of rows of the electronic parameter chart and a column input to indicate a selected column from the plurality of columns of the electronic parameter chart,
wherein an intersection of the selected row and the selected column in the electronic parameter chart is representative of a combination of at least two of the following parameters: a workpiece material, a tungsten type, a tungsten size, an electrode type, an electrode size, an electrode wire type, a shielding gas composition, a shielding gas flow rate, an electrode wire diameter, an arc start, an inductance, and a workpiece thickness,
wherein the selected row corresponds to a first value of at least a first one of the at least two parameters for all of the plurality of columns,
wherein the selected column corresponds to a second value of at least a second one of the at least two parameters for all of the plurality of rows, and
wherein the selected row and the selected column represent different parameters;
a welding power supply configured to provide welding power;
a welding processor configured to determine, based on the selected row and the selected column, welding parameters; and
a controller configured to control the welding system based on the determined welding parameters.

2. The welding system of claim 1, wherein the welding parameters comprise at least one of welding voltage, wire feed speed, and welding current.

3. The welding system of claim 1, wherein the display device is configured to display at least a portion of the electronic parameter chart.

4. The welding system of claim 1, wherein the display device is configured to display a first portion of the electronic parameter chart, and to display a different portion of the electronic parameter chart based on at least one display input received via the user interface.

5. The welding system of claim 4, wherein the display input comprises at least one of a first display input for controlling displaying of rows of the electronic parameter chart and a second display input for controlling displaying of columns of the electronic parameter chart.

6. The welding system of claim 1, wherein the welding processor is configured to control a welding operation according to the welding parameters.

7. The welding system of claim 1, wherein the welding processor is configured to update the electronic parameter chart.

8. The welding system of claim 1, wherein the welding processor is configured to format the electronic parameter chart for the display device based on a readability setting.

9. The welding system of claim 1, wherein the row input comprises a first selection of at least one of a workpiece material, a tungsten type, a tungsten size, an electrode type, an electrode size, an electrode wire type, a shielding gas composition, a shielding gas flow rate, an electrode wire diameter, arc start, wire inductance, and a workpiece thickness.

10. The welding system of claim 9, wherein the column input comprises a second selection of at least one of the workpiece material, the tungsten type, the tungsten size, the electrode type, the electrode size, the electrode wire type, the shielding gas composition, the shielding gas flow rate, the electrode wire diameter, arc start, wire inductance, and the workpiece thickness, the second selection being different from the first selection.

11. The welding system of claim 1, wherein the welding processor is configured to determine the welding parameters using the selected row and the selected column via at least one of a pre-determined time and receiving a selection input via the user interface.

12. The welding system of claim 1, wherein the welding processor is configured to determine the welding parameters after a pre-determined time after receiving at least one of the selected row and selected column.

13. The welding system of claim 1, wherein the welding processor is configured to determine the welding parameters after receiving a selection input via the user interface after receiving at least one of the selected row and selected column.

14. The welding system of claim 1, wherein the welding processor is configured to determine the welding parameters after receiving a selection input via the user interface without receiving first at least one of the selected row and selected column.

15. The welding system of claim 1, wherein the welding processor is configured to output a message indicating that the welding parameters are not determined after receiving a selection input via the user interface without receiving first at least one of the selected row and selected column.

16. The welding system of claim 1, further comprising a wire feeder configured to feed electrode wire.

17. The welding system of claim 1, wherein the selected row and the selected column are finalized after a pre-determined time of inactivity of the user interface.

18. A non-transitory machine-readable medium storing machine executable instructions that when executed causes a computing system to perform a method of setting up and controlling a welding system, the method comprising:
displaying an electronic parameter chart on a display device of the welding system, the electronic parameter chart relating at least one of voltage, wire feed speed, and welding current to characteristics of a welding operation, wherein the electronic parameter chart comprises a plurality of rows that intersect a plurality of columns;
receiving, via a user interface of the welding system, a row input to indicate a selected row of the electronic parameter chart displayed on the display device;
highlighting, via the display device, the selected row, wherein the selected row corresponds to a first value of at least a first one of the at least two parameters for all of the plurality of columns;
receiving, via the user interface of the welding system, a column input to indicate a selected column of the electronic parameter chart displayed on the display device, wherein the selected row and the selected column represent different parameters;
highlighting, via the display device, the selected column, wherein the selected column corresponds to a second value of at least a second one of the at least two parameters for all of the plurality of rows;
setting, using a welding processor, welding parameters comprising at least one of a welding voltage, a wire feed speed, and welding current based on the selected row and the selected column; and controlling, using a controller, the welding system based on the determined welding parameters, wherein a combination of the selected row and the selected column in the electronic parameter chart is representative of a combination of at least two of the following parameters: a workpiece material, a tungsten type, a tungsten size, an electrode type, an electrode size, an electrode wire type, a shielding gas composition, a shielding gas flow rate, an electrode wire diameter, an arc start, an inductance, and a workpiece thickness.

19. The non-transitory machine-readable medium of claim 18, further comprising instructions for controlling the welding operation according to the welding parameters.

20. The non-transitory machine-readable medium of claim 18, further comprising instructions for updating the electronic parameter chart.

21. The non-transitory machine-readable medium of claim 18, further comprising instructions for determining the welding parameters after at least one of an elapsed predetermined time and receiving a selection input via the user interface of the welding system.

22. A welding system comprising:

a display device configured to display an electronic parameter chart, wherein the electronic parameter chart comprises a plurality of rows that intersect a plurality of rows;

a user interface configured to:

receive at least one of a row input to indicate a selected row from the plurality of rows and a column input to indicate a selected column from plurality of rows, wherein the selected row and the selected column represent different parameters, wherein the selected column is highlighted on the display device in response to the column input and the selected row is highlighted on the display device in response to the row input, wherein an intersection of the selected row and the selected column in the electronic parameter chart is representative of a combination of at least two parameters, wherein the selected row corresponds to a first value of at least a first one of the at least two parameters for all of the plurality of columns, and wherein the selected column corresponds to a second value of at least a second one of the at least two parameters for all of the plurality of rows;

a welding power supply configured to provide welding power; and a welding processor configured to determine, based on the selected row and the selected column, welding parameters; and a controller configured to control the welding system based on the determined welding parameters.

* * * * *